Dec. 29, 1931.  A. L. ALAJ  1,838,206
ELECTRIC PERCOLATOR
Filed Jan. 17, 1931
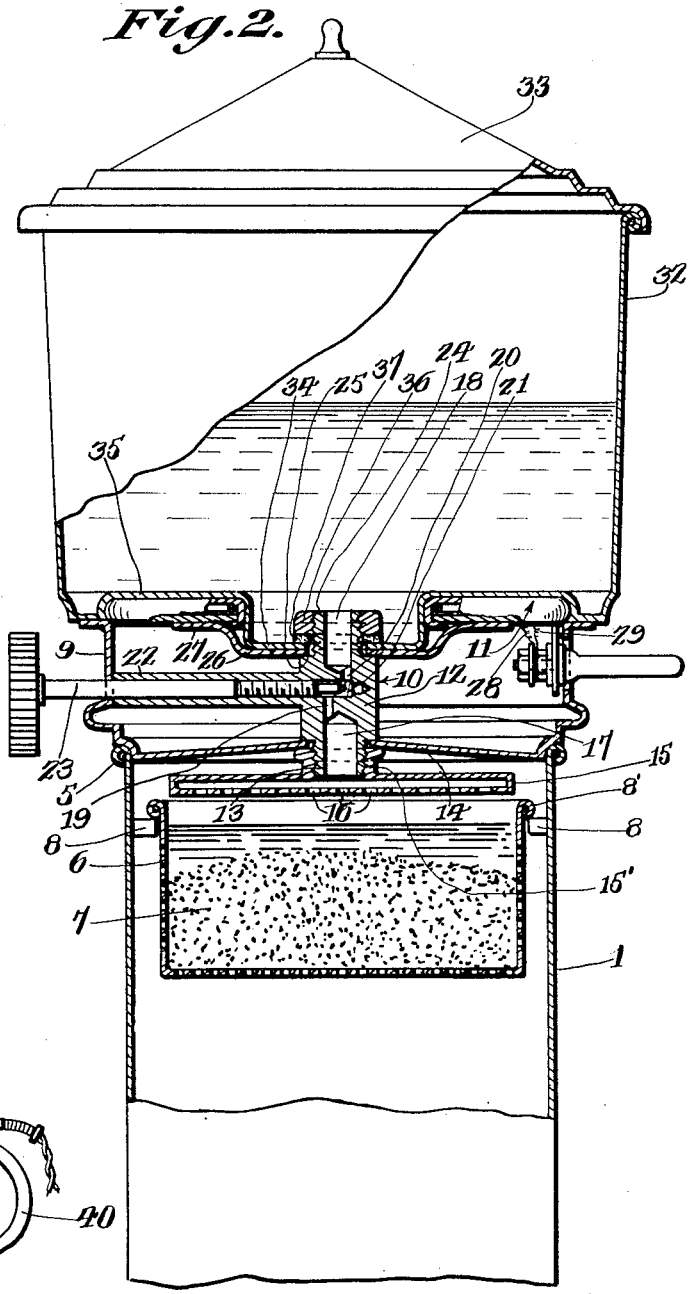
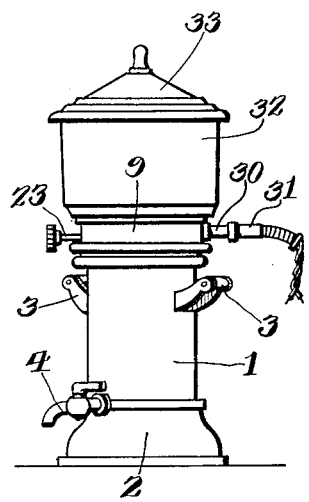
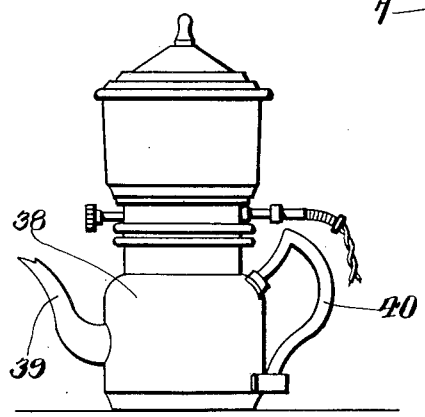
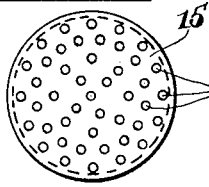
INVENTOR.
Antoine L. Alaj
BY Geo. P. Kimmel
ATTORNEY.

Patented Dec. 29, 1931

1,838,206

UNITED STATES PATENT OFFICE

ANTOINE L. ALAJ, OF CHICAGO, ILLINOIS

ELECTRIC PERCOLATOR

Application filed January 17, 1931. Serial No. 509,484.

This invention relates to an electric percolator and has for its primary object to provide, in a manner as hereinafter set forth, a percolator by means of which coffee may be prepared having a pleasant aroma and further having a rich flavor entirely free from caffeine, tannic acid, and other bitter elements.

A further object of the invention is to provide a percolator of the character aforesaid, by means of which coffee may be prepared without boiling the coffee solution and without subjecting the solution to contact with the grounds used in preparing the coffee.

A further object of the invention is to provide a percolator of the character aforesaid which is inexpensive to manufacture, simple to use, and which is also applicable for preparing tea.

With the foregoing and other objects in view, the invention consists of the novel construction, combination and arrangement of parts as hereinafter more particularly described and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is an elevation of a percolator in accordance with this invention.

Figure 2 is an enlarged sectional elevation thereof.

Figure 3 is an elevation of a modified form of percolator in accordance with this invention.

Figure 4 is a reduced bottom plan of the spray element through which hot water is ejected onto the coffee grounds.

Referring to the drawings in detail, the numeral 1 indicates a receptacle for containing the coffee solution, such receptacle preferably being of cylindrical formation, and preferably being mounted on a suitable base 2. The receptacle 1 is provided with a pair of handle members 3 in order that the percolator may be conveniently handled and is further provided with a spigot 4 through which the solution may be drawn when it is desired to use the same. The receptacle 1 preferably is formed with an open upper end with the wall of the percolator being rolled at its upper edge as indicated at 5. Disposed within the receptacle 1 is a perforated basket 6 for containing coffee grounds 7, the basket 6 preferably being supported on a plurality of lugs 8 which extend from the inner face of the receptacle 1 and project beneath the rolled upper edge 8' of the basket 6.

Seated on the receptacle 1, and closing the upper end thereof, is a substantially cylindrical carrier 9 for a valve indicated generally at 10 and a heating element indicated generally at 11. The valve 10 includes a vertically disposed housing 12 having a reduced, externally threaded lower end 13 extending through an opening formed centrally of the bottom 14 of the carrier 9. The housing 12 is maintained in position with respect to the carrier 9 by means of a spray element 15 which is substantially in the shape of a shallow pan having its upper wall formed with a neck 15' threaded on the extension 13. The element 15 covers substantially the entire area of the basket 6 and is formed in the bottom thereof with a plurality of openings 16 for a purpose to be hereinafter referred to. End portions of the housing 12 are formed with relatively large, aligned openings 17 and 18 which are in communication respectively with relatively small, vertically offset openings 19 and 20. Communication between the openings 19 and 20 is established by means of a horizontally disposed opening 21 arranged centrally of the housing 12. Formed with the housing is a horizontally disposed, tubular projection 22, the inner wall of which is in alignment with the wall of the opening 21. Extending through the projection 22, and threadedly engaged with an inner end portion thereof, is a valve stem 23 by means of which the opening 20 may be closed to the opening 19. The housing 12 is provided with a reduced, externally threaded upper end portion 24 whereby the housing is provided with an external shoulder 25. Encircling the portion 24 and seating on the shoulder 25 is an annular supporting member 26 which is formed with an upwardly peripheral portion 27. Seated on the portion 27 is the heating element 11 which is of annular construction and which projects both inwardly and outwardly beyond the portion 27. The heating element 11 is provided with a pair of conductors 28 and 29 which are connected with a plug element 30 adapted for connection with an electrical lead in line 31.

Seated on the supporting member 26 and carrier 9 is a water container 32 which is preferably of cylindrical construction and which is formed with a suitable cover 33. The bottom of the container 32 is formed with a centrally arranged, depending portion 34 which is centrally apertured for the reception of the reduced extension 24 therethrough. Encircling the portion 34, the bottom of the container is formed with an upwardly projecting annular portion 35 into which the heating element 11 projects. The container 32 is held in position by means of a nut 36 threaded on to the reduced extension 24, the water within the container being prevented from leaking out around the extension 24 by means of a suitable gasket 37 disposed beneath the nut 36.

The percolator illustrated in Figure 3 is the same in every respect as that illustrated in Figure 1 except for the modified shape of the coffee solution receptacle 38. The receptacle 38 is of less height and of greater diameter than the receptacle 1, and is provided with a spout 39 oppositely disposed with respect to a handle member 40.

In the use of a percolator in accordance with this invention, the basket 6 is filled or substantially filled with ground coffee, and the container 32 is filled or substantially filled with water. The heating element 11 is then connected through its plug 30 with a source of electrical supply, by means of which the water within the container is heated. When the water within the container 32 becomes steaming hot, the valve stem 23 is manipulated to permit the water to pass from the container 32 through the housing 12 to be discharged through the spray member 15 on to the ground coffee 7, through which the hot water seeps and drips from the basket 6 into the receptacle 1. It is to be noted that there is no heating of the contents of the receptacle 1, and that no portion of the ground coffee 7 is ever submerged in a boiling liquid.

It is thought that the many advantages of a percolator in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. An electric percolator comprising, a coffee solution receptacle, a carrier member seated thereon, a valve housing carried by the carrier member and projecting through the bottom thereof, a spray member secured to the valve housing and projecting into the receptacle, a water container seated on the carrier member and having said housing projecting through the bottom thereof, said valve housing having end portions thereof formed with vertically offset, longitudinally extending openings, said valve housing further having a horizontally disposed opening for establishing communication between said vertically offset openings, a tubular extension projecting laterally from the valve housing and having its inner wall in alignment with the wall of said horizontally disposed openings, a valve stem extending through said tubular projection for closing said vertically offset openings to each other, means for supporting a supply of ground coffee beneath the spray member, and an electrical heating element seated on the carrier member and engaging the bottom of the container for heating the water within the latter.

2. An electric percolator comprising, a coffee solution receptacle, a carrier member seated thereon, a valve housing carried by the carrier member and projecting through the bottom thereof, a spray member secured to the valve housing and projecting into the receptacle, means for supporting a supply of ground coffee beneath the spray member, an annular supporting member seated on the valve housing and having an upwardly offset peripheral portion, an electrical heating element seated on said upwardly offset peripheral portion, and a water container seated on said annular supporting member and carrier member, said valve housing having means to provide a closable passageway from the container to the receptacle.

3. A percolator comprising, a coffee solution receptacle, a water container supported above said receptacle in spaced relation thereto, a vertically disposed valve housing projecting into said receptacle and container, said valve housing having end portions thereof formed with vertically offset, longitudinally extending openings and further having a horizontally disposed opening for establishing communication between said vertically offset openings, a tubular extension projecting laterally from the valve housing, a valve stem extending through said tubular extension and into said horizontally disposed opening for closing said vertically offset openings to each other, means for supporting a supply of ground coffee beneath the valve housing, and means for heating water within said container.

In testimony whereof, I affix my signature hereto.

ANTOINE L. ALAJ.